US00RE36127E

United States Patent [19]

Lang

[11] E Patent Number: Re. 36,127

[45] Reissued Date of Patent: Mar. 2, 1999

[54] MOTOR VEHICLE MOVEMENT CONTROL

[76] Inventor: Ernest U. Lang, 1510 Platt St., Niles, Mich. 49120

[21] Appl. No.: 731,547

[22] Filed: Oct. 1, 1996

Related U.S. Patent Documents

Reissue of:

[64] Patent No.: 5,125,485
Issued: Jun. 30, 1992
Appl. No.: 254,823
Filed: Oct. 7, 1988

U.S. Applications:

[63] Continuation of Ser. No. 266,568, Jun. 28, 1994, abandoned.

[51] Int. Cl.[6] ..... B60K 41/20

[52] U.S. Cl. ..... 477/210; 180/178

[58] Field of Search ..... 477/199, 200, 477/210, 211; 701/71, 78; 180/178, 179

[56] References Cited

U.S. PATENT DOCUMENTS

| | | | |
|---|---|---|---|
| 2,200,973 | 5/1940 | Struck . | |
| 2,610,716 | 9/1952 | Adams et al. . | |
| 3,059,416 | 10/1962 | Campbell . | |
| 3,331,479 | 7/1967 | Pascual . | |
| 4,132,284 | 1/1979 | Tomecek | 180/179 |
| 4,408,293 | 10/1983 | Axins | 180/179 |
| 4,729,104 | 3/1988 | Hara | 180/179 |
| 4,750,598 | 6/1988 | Danno et al. . | |

FOREIGN PATENT DOCUMENTS

| | | |
|---|---|---|
| 1201623 | 1/1960 | France . |
| 59-79639 | 11/1985 | Japan . |

*Primary Examiner*—Dirk Wright
*Attorney, Agent, or Firm*—Ernest U. Lang

[57] ABSTRACT

[A movement control system for a motor vehicle comprising a movement control device, an acceleration or deceleration signal and a vehicle speed reference signal insensitive to the vehicles' direction are sent to a controller. The system also includes a throttle actuator, brake actuator and anti-lock braking. The controller which receives the acceleration or deceleration signal and vehicle speed reference signal calculates the rate of change of vehicle speed and energizes either the throttle actuator or brake actuator so that the calculated rate of change of speed compares favorably to the reference signal from the movement control device. A cruise control sends a reference speed signal to the controller which compares it to the vehicle speed signal and energizes either the throttle actuator or brake actuator so that the two signals favorably compare, thus controlling the vehicle speed while in the cruise control mode.]

*A movement control system for motor vehicle (17) comprising controller (3) receiving reference signal (2) from movement control device (1)* and energizing brake actuator (6), *wherein the motor vehicle is equipped with anti-lock braking (16). In one embodiment signal (2) calls for maximum engine speed at one end of its range and maximum braking at the other end of its range. In another embodiment, signal (2) calls for maximum acceleration at one end of its range and maximum deceleration at the other end of its range, wherein controller (3) calculates the rate of change of the vehicle speed signal (4) which is insensitive to the vehicle's direction, and energizes either throttle actuator (5) or brake actuator (6) until controller's calculated rate of change of speed compares favorably with reference signal (2). Cruise control compares specifically displayed cruise signal (8) with vehicle speed signal (4). Acceleration control to cruise speed uses reference signal (9). Reference signal (13) from cruise start calls for zero acceleration.*

17 Claims, 1 Drawing Sheet

Fig.1
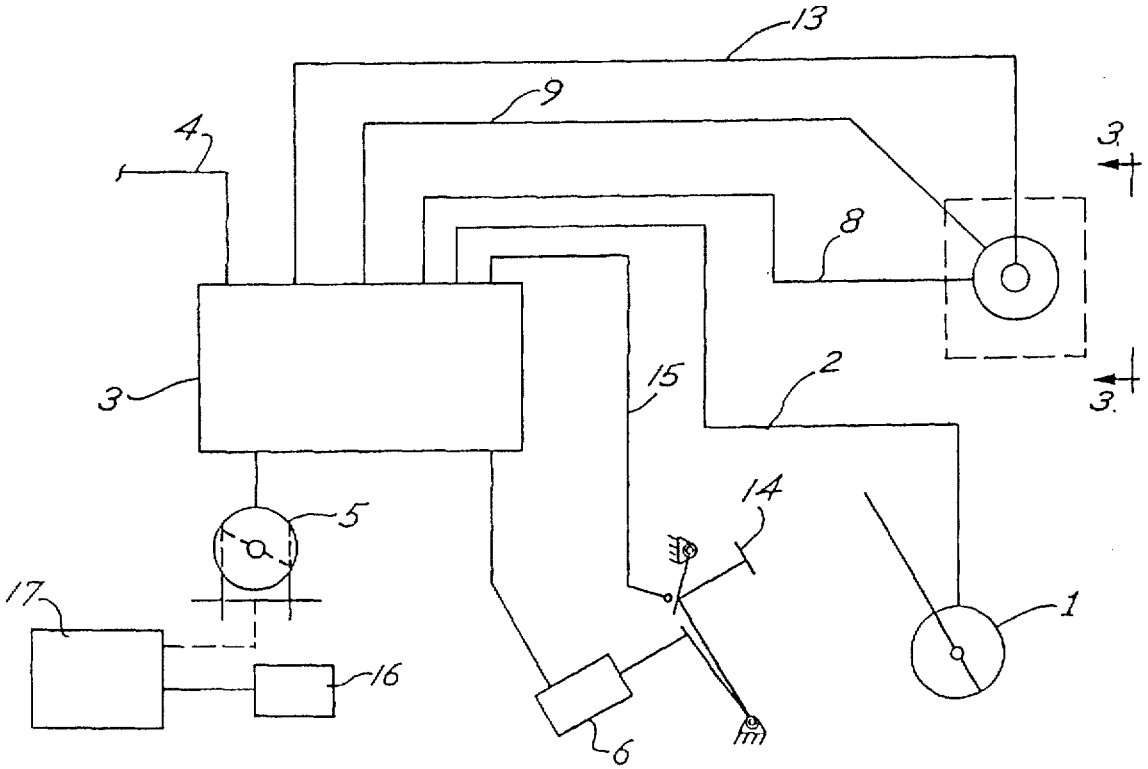
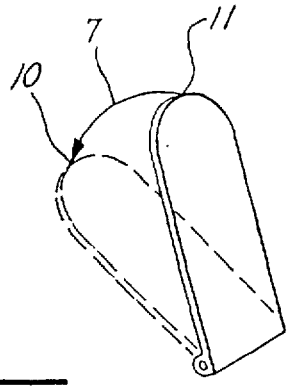
Fig.2
Fig.3
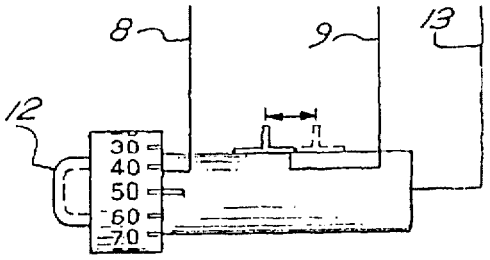

MOTOR VEHICLE MOVEMENT CONTROL

Matter enclosed in heavy brackets [ ] appears in the original patent but forms no part of this reissue specification; matter printed in italics indicates the additions made by reissue.

*This application is a continuation of application Ser. No. 08/266,568, filed Jun. 28, 1994, now abandoned.*

BACKGROUND OF THE INVENTION

As early as 1933 U. S. Pat. No. 1,919,930 (Control Mechanism for Motor Vehicles) best summarized in claim 1, discloses a single operating member for controlling the speed of the vehicle. Additionally, U.S. Pat. Nos. 2,051,906, 2,063,793, 2,081,254, 2,102,586, 2,135,071, and 2,325,771 of August, 1943 all pertain to apparatus with a single operating member for controlling the speed of the vehicle.

In 1952 U.S. Pat. No. 2,610,716 recognized the need to prevent skidding (Column 8, line 67) and provided a "manipulative pre-set mechanism under the control of a driver for adjusting the operation of the brakes."

SUMMARY OF THE INVENTION

Anti-lock braking, as provided on some contemporary vehicles, makes a single operating member practical and is a fundamental part of the invention.

Further, in order to get a more uniform response from specific positions of the movement control device regardless of the degree the vehicle is loaded or whether it is going up or down hill, the invention includes, under the control of the driver, a true accelerator (controlling rate of change of speed of the vehicle).

DRAWINGS

FIG. 1 shows the overall arrangement of the invention.

FIG. 2 shows the operator control element of the movement control device.

FIG. 3 shows detail of cruise control signals.

PREFERRED EMBODIMENT

The preferred embodiment comprises

A movement control device 1 providing a reference signal 2 to a controller 3

An additional signal 4 to the controller, insensitive to whether the *motor* vehicle *17* is moving forward or backward, corresponding to the speed of the vehicle A throttle actuator 5

A brake actuator 6 and anti-lock braking 16 wherein controller 3 calculates the rate of change of speed of the vehicle and energizes either the throttle actuator 5 or brake actuator 6 to the extent necessary to make the calculated rate of change of speed compare as favorably as possible to the reference signal 2 provided by the movement control device.

A partial advantage can be obtained if only the brake actuator is controlled automatically and the throttle is directly under the control of the operator.

The actuators, energized preferably by an electronic controller, can utilize electrical, pneumatic, or electro-hydraulic power. The throttle actuator is preferably a rotary electric device connected to the throttle shaft and working against a light spring providing safety in case of system failure and a correct position of the throttle when starting the engine. The brake actuator preferably utilizes an electro-hydraulic system with the hydraulic power source being the motor pump assembly of the anti-lock brake system.

OPERATION

Under normal operating conditions, particularly with electronic fuel injection, the engine will start at idle and the brakes will be fully actuated without an attention from the operator. There will be no movement when the transmission is shifted into either reverse or drive. When movement is desired the operator will move the movement control device past the zero acceleration position 7 the amount desired to achieve the given acceleration. To maintain an achieved speed the operator will return the movement control device to the zero acceleration position. In order to slow down the operator will position the device for the desired deceleration. The controller may simply deenergize the throttle actuator to the extent necessary but may find energization of the brake actuator necessary.

When there is not enough friction between the tires and the pavement the anti-lock mechanism will pulse the brakes.

Since the signal 4 corresponding to the speed of the vehicle is insensitive to whether the vehicle is moving forward or backward nothing special need be done when the vehicle is in reverse.

When in cruise control the controller will energize the actuators so that the signal 4 corresponding to the speed of the motor vehicle is used to compare to the reference signal 8 of the cruise control. Further the cruise control may call for a specific acceleration 9 in reaching the cruise speed.

Hill hold at rest will be automatic whether going up or down hill. If the operator becomes totally incapacitated and is free from the movement control device, as safe and quick a stop as possible will be achieved.

If the operator maintains a position calling for maximum acceleration 10 the throttle actuator will be fully energized and the top speed of the motor vehicle will be reached; and the calculated rate of change of speed will no longer compare favorably to the reference signal but will still compare as favorably as possible.

If maximum deceleration 11 is called for the vehicle will decelerate as rapidly as possible without locking up the wheels. On slippery surfaces the calculated rate of change of speed will not compare favorably to the reference signal but will compare as favorably as possible.

When the vehicle is at rest and any deceleration is called for the brake actuator will be fully energized.

A procedure for "getting into cruise" comprises pressing a start button 12 and holding it until the movement control device is moved to the maximum deceleration position, during which time the signal 13 calls for zero acceleration, and then releasing the start button thus "getting into cruise." This can be done when the vehicle is at rest or moving at any speed. Once at cruise speed the speed setting may be changed and the vehicle speed will follow.

"Getting out of cruise" can be achieved by moving the movement control device to preferably a position calling for relatively low deceleration or zero deceleration thus signalling controller 3 to then compare the calculated rate of change of speed to the acceleration reference signal.

Although not normally used, a regular brake pedal 14 is desireable in case there is system failure or an emergency arises while in cruise. Pressing the brake pedal will provide signal 15 getting the vehicle out of cruise as well as preventing any energization of the throttle or brake actuators until either cruise is reenergized or the movement control device is moved to at least the position calling for relatively low deceleration.

I claim:

1. A movement control system of a motor vehicle comprising a controller receiving a plurality of signals and energizing at least one actuator wherein at least one of said plurality of signals emanates from a movement control device, controlled throughout its range by an operator of said motor vehicle, and provides specific [acceleration or deceleration] *rate of change of speeding up or rate of change of slowing down* signal values corresponding to specific positions of the movement control device and another of said plurality of signals is a signal corresponding to speed of the motor vehicle and is characterized by being insensitive to whether the vehicle is moving forward or backward.

2. The movement control system of claim 1 wherein said at least one actuator is a brake actuator of a brake system of the motor vehicle wherein the controller calculates rate of change of speed of the vehicle and energizes the brake actuator to the extent necessary so that calculated rate of change of speed compares as favorably as possible to the reference signal provided by the movement control device, *and wherein said brake system of said vehicle includes an anti-lock brake system.*

3. The movement control system of claim 1 wherein a specific position of [the] said movement control device calls for zero [acceleration] *rate of change of speed* of said vehicle, the range on [the] *one* side of said specific position for zero [acceleration] *rate of change of speed* calling for increasing values of [acceleration] *rate of change of speeding up* and the range on the other side of said specific position for zero [acceleration] *rate of change of speed* calling for increasing values of [deceleration] *rate of change of slowing down.*

4. The movement control system of claim 1 wherein said at least one actuator is a throttle actuator and further comprising a brake actuator *of a brake system of said motor vehicle* wherein the controller calculates rate of change of speed of the vehicle and energizes either the throttle actuator or the brake actuator to the extent necessary so that calculated rate of change of speed of the vehicle compares as favorably as possible to the reference signal provided by the movement control device *and wherein said brake system of said vehicle includes an anti-lock brake system.*

5. [The] *A* movement control system of [claim 1] *a motor vehicle* wherein [said] at least one actuator is a throttle actuator of an engine of said motor vehicle and further comprising a brake actuator of a *primary* brake system of said vehicle *still* further comprising a speed reference signal from a cruise control wherein [the] *a* controller energizes either the throttle actuator or brake actuator to the extent necessary so that the speed reference signal compares as favorably as possible to the signal corresponding to the speed of the vehicle *and wherein said brake system of said vehicle includes an anti-lock brake system.*

6. The movement control system of claim [1] *5* further comprising a rate of change of speed reference signal from the cruise control wherein the controller energizes either the throttle actuator or brake actuator *of a brake system of the motor vehicle* to the extent necessary to produce a rate of change of speed comparing *as* favorably *as possible* to the rate of change of speed reference signal until a vehicle speed is reached when the speed reference signal compares as favorably as possible to the signal corresponding to the speed of the vehicle *and wherein said brake system of said vehicle includes an anti-lock brake system.*

[7. The movement control system of claim 1 wherein the at least one of said plurality of signals is a specific acceleration or deceleration signal from a movement control device.]

8. The movement control system of claim 5 whereby initiation [or] *of* cruise control is achieved by pressing *and releasing* a cruise start button which, while depressed, calls for zero [acceleration] *rate of change of speed* or very low [deceleration] *rate of change of slowing down* overriding any [acceleration or deceleration] *signal* called for by the movement control device, [and then releasing the cruise start button;] and whereby conclusion of cruise control is achieved by moving the movement control device to at least a position of very low or zero [deceleration] *rate of change of slowing down.*

9. The movement control system of claim 8 further comprising a brake pedal under the control of the operator wherein conclusion [or] *of* cruise control can be achieved by depressing the brake pedal which then also deactivates the throttle and brake actuators until either the cruise start button is depressed and released or the movement control device is moved to at least a position of very low or zero [decelerations] *rate of change of slowing down.*

[10. The movement control system of claim 2 wherein said brake system of said vehicle includes an anti-lock brake system.]

[11. The movement control system of claim 4 wherein said brake system of said vehicle includes an anti-lock brake system.]

12. [The] *A* movement control system [of claim 1] *of a motor vehicle* wherein [said] at least one actuator is a throttle actuator of an engine of said motor vehicle, said system further comprising [an acceleration] *a rate of change of speeding up* reference *signal* from a cruise control wherein [the] *a* controller energizes the throttle actuator to the extent necessary to produce [an acceleration] *a rate of change of speeding up of the vehicle* comparing *as* favorably *as possible* to the [acceleration] reference signal until a speed *of the vehicle* is reached when a cruise speed reference signal compares as favorably as possible to [said] *a* signal corresponding to the speed of the vehicle.

13. A movement control system for a motor vehicle comprising a controller receiving a plurality of signals and energizing at least one actuator wherein at least one of said plurality of signals emanates from a cruise speed control device, controlled throughout its range by an operator of said motor vehicle, and provides specific cruise speed signal values corresponding to specifically displayed speed control device settings, [and] another of said plurality of signals is a signal corresponding to speed [to] *of* the motor vehicle [.] *and still another of said plurality of signals is a signal calling for a specific rate of change of speed of the vehicle up or down to a specific cruise speed.*

[14. The movement control system of claim 13 wherein one of said plurality of signals is a signal calling for a specific rate of change of speed of the vehicle up or down to a specific cruise speed.]

15. The movement control system of claim 13 wherein another of said plurality of signals is a zero [acceleration] *rate of change of speed* or very low [deceleration] *rate of change of slowing down* signal provided by depression of a cruise start button.

16. The movement control system of claim 13 wherein another of said plurality of signals is a cruise conclusion signal provided by movement of a movement control device to a position of [very low or] zero [deceleration] *rate of change of speed or very low rate of change of slowing down.*

17. The movement control system of claim 13 wherein said at least one actuator is a throttle actuator for an engine of said vehicle wherein the controller energizes the throttle actuator to the extent necessary so that *the* cruise speed reference signal compares as favorably as possible to the signal corresponding to speed of the motor vehicle.

*18. A movement control system for a motor vehicle comprising a controller receiving at least a signal from a movement control device and energizing at least a brake actuator of a brake system of said vehicle, characterized in that said movement control device, controlled throughout its range by an operator of said vehicle, calls for maximum engine speed when positioned at one end of its range, in that said movement control device itself is biased, at any and all times whenever the operator is free from the movement control device, to a position calling for maximum braking, wherein said movement control device is the sole determinant of the extent of the range of movement of said device, and in that said brake system is an anti-lock brake system.*

*19. A movement control system according to claim 18 characterized in that said brake system further includes a brake pedal controlled by said operator of said motor vehicle, said brake pedal providing alternate energizing means for said brake system.*

*20. A movement control system according to claim 18 characterized in that said energization of the brake actuator by the controller utilizes electro-hydraulic or electro-pneumatic means providing specific degrees of energization of the brake actuator for specific values of said signal from the movement control device.*

*21. The movement control system according to claim 18 further comprising a throttle actuator and a cruise reference signal wherein the controller energizes either the throttle actuator or brake actuator to the extent necessary so that the speed of the motor vehicle compares as favorably as possible to the speed indicated by the cruise speed reference signal.*

* * * * *